US007439950B2

(12) United States Patent
Carlberg

(10) Patent No.: US 7,439,950 B2
(45) Date of Patent: Oct. 21, 2008

(54) CLUTCH MECHANISM FOR A RAISED DISPLAY APPARATUS

(75) Inventor: Christian Carlberg, Culver City, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 788 days.

(21) Appl. No.: 10/929,631

(22) Filed: Aug. 30, 2004

(65) Prior Publication Data

US 2006/0044256 A1 Mar. 2, 2006

(51) Int. Cl.
*F16D 65/56* (2006.01)

(52) U.S. Cl. .............................. 345/108; 345/5; 345/87; 345/111; 192/34; 192/41 R; 192/48; 192/105; 312/294; 312/306; 361/681

(58) Field of Classification Search ..................... 345/5, 345/87, 108, 111; 192/34, 41 R, 48.3, 71, 192/105; 312/294, 306; 361/681
See application file for complete search history.

(56) References Cited

U.S. PATENT DOCUMENTS

| | | | | |
|---|---|---|---|---|
| 2,127,097 | A * | 8/1938 | Wenn | 74/531 |
| 2,170,511 | A * | 8/1939 | Wenn | 74/531 |
| 2,312,136 | A * | 2/1943 | Triest | 401/48 |
| 3,737,012 | A * | 6/1973 | Haydu | 188/202 |
| 3,824,930 | A * | 7/1974 | Biessener | 104/172.2 |
| 3,876,310 | A * | 4/1975 | Berndt | 356/155 |
| 4,412,799 | A | 11/1983 | Gates | |
| 4,473,356 | A | 9/1984 | Fernando et al. | |
| 4,586,904 | A | 5/1986 | Chlumsky | |
| 4,871,992 | A | 10/1989 | Peterson | |
| 5,086,287 | A | 2/1992 | Nützel | |
| 5,226,817 | A | 7/1993 | Nakajima et al. | |
| 5,580,251 | A | 12/1996 | Gilkes et al. | |
| 5,718,588 | A | 2/1998 | Tretiakoff et al. | |
| 5,793,918 | A | 8/1998 | Hogan | |
| 5,942,970 | A | 8/1999 | Norman | |
| 6,022,220 | A | 2/2000 | Haugen | |

(Continued)

FOREIGN PATENT DOCUMENTS

WO WO 02/080134 A1 10/2002

OTHER PUBLICATIONS

Robert Little, "*Firm Creates Maps on Virtual 'Sand Tables'*", Published Dec. 2, 2002, http://www.sunspot.net/technology/bal-bz.xenotran . . . , pp. 1-3.

(Continued)

*Primary Examiner*—Bipin Shalwala
*Assistant Examiner*—Vince E Kovalick
(74) *Attorney, Agent, or Firm*—Tarolli, Sundheim, Covell & Tummino LLP

(57) ABSTRACT

Systems and methods are provided for securing a pin within a raised display system. A washer surrounds the pin. A washer recess comprises a contact surface configured as to bring the washer into a tilted position relative to the pin, such that the washer is brought into physical communication with the pin. A reset mechanism moves at least a portion of the washer to force the washer into a position substantially level relative to the pin, such that the pin can move freely through the washer. An electromagnet holds the washer in the substantially level position when the electromagnet is activated.

18 Claims, 4 Drawing Sheets

U.S. PATENT DOCUMENTS

| | | | |
|---|---|---|---|
| 6,189,246 | B1 | 2/2001 | Gorthala |
| 6,417,821 | B1 | 7/2002 | Becker et al. |
| 6,535,201 | B1 | 3/2003 | Cooper et al. |
| 6,625,088 | B1 | 9/2003 | Mah et al. |
| 2003/0117371 | A1 | 6/2003 | Roberts et al. |
| 2003/0117490 | A1 | 6/2003 | Tecu et al. |

OTHER PUBLICATIONS

*Xenotran World Class Engineering & Design, Products*, http://www.xenotran.com/products.htm.

Directions Staff, "'*Wow Technology' Found Among the Many Exhibitors at the ESRI User's Conference*", http://www.directionsmag.com/article.php?article_id=641, pp. 1-7.

* cited by examiner

CLUTCH MECHANISM FOR A RAISED DISPLAY APPARATUS

CROSS REFERENCE TO RELATED APPLICATIONS

This application is related to U.S. patent application Ser. No. 10/753,995, which was filed on Jan. 8, 2004 and entitled "RAISED DISPLAY APPARATUS", which is incorporated herein by reference.

TECHNICAL FIELD

The present invention relates to mechanical displays and further to a clutch mechanism for a raised display apparatus.

BACKGROUND OF THE INVENTION

Raised displays provide a compelling method of representing images that are textured or relieved in nature. Generally, such systems employ an array of closely spaced pins, each representing an image element. These pins can be raised to a desired height to form a textured image. The resolution of the display is a function of the density of the pins and the number of positions into which they can be raised. It will be appreciated that the space consumed by an assembly for moving the pins within the device can be a limiting factor on the density of the pins.

In general, raised displays require a substantial amount of time to display an image. In a typical raised display, respective raising mechanisms for each pin, such as a plurality of solenoids, are actuated individually to provide an image. Even a small display can require thousands of pins, making plotting a raised image in this fashion a time-consuming process. A larger, table-sized display can require plotting millions of pins. Individually actuating raising mechanisms for each pin in such a display would be sufficiently time-consuming as to be impractical for most applications.

SUMMARY OF THE INVENTION

In accordance with one aspect of the present invention, a clutch assembly is provided for securing a pin within a raised display system. A washer surrounds the pin. A washer recess comprises a contact surface configured as to bring the washer into a tilted position relative to the pin, such that the washer is brought into physical communication with the pin. A reset mechanism moves at least a portion of the washer to force the washer into a position substantially level relative to the pin, such that the pin can move freely through the washer. An electromagnet holds the washer in the substantially level position when the electromagnet is activated.

In accordance with another aspect of the present invention, a display system is provided for displaying raised images. A plate moves along at least one axis of motion, the movement of the plate being operative to adjust respective positions associated with a plurality of pins along the axis of motion. A plurality of clutch mechanisms operate in conjunction with the plate to position the plurality of pins at desired positions along the axis of motion as to deform a display surface defined by the plurality of pins. A given clutch mechanism comprises a washer surrounding an associated one of the plurality of pins. The washer is operative to assume a first position and a second position. A reset mechanism adjusts the washer from the first position to the second position. An electromagnet holds the washer in the second position when the electromagnet is activated.

In accordance with yet another aspect of the present invention, a method for displaying raised images using a plurality of pins is provided. Respective washers associated with the plurality of pins are reset from a first position, in which the pins are secured, to a second position, in which the pins can move freely. Respective electromagnets associated with the washers are activated to maintain the washers in the second position. An electromagnet associated with a given washer is deactivated to allow the washer to return to the first position when its associated pin is in a desired position.

DETAILED DESCRIPTION OF INVENTION

The present invention relates to systems and methods for securing the motion of a pin within a raised display. The display can comprise a plurality of pins that can be secured at a desired level to produce a desired image. A clutch mechanism associated with each pin comprises a washer that can assume a first position, in which the pin is secured, and a second position, in which the pin moves freely. A reset mechanism can be used to push the washer into the second position, and an electromagnet associated with the washer can be activated to maintain it in the second position. When it is desirable to secure the pin, the electromagnet can be deactivated, allowing the washer to return to the first position. In an exemplary embodiment, the display can include a membrane that covers the display and a projector to project an image onto the membrane.

Figure 1:
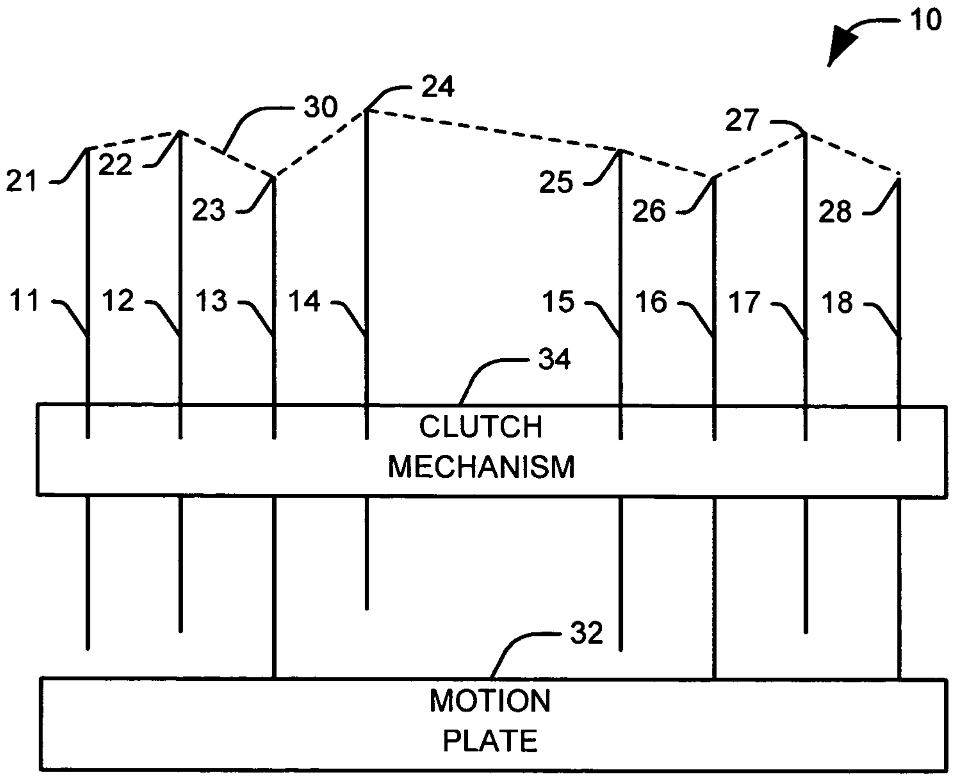
FIG. 1 illustrates a functional diagram of a raised display apparatus in accordance with an aspect of the present invention.

FIG. 1 illustrates a functional diagram of a raised display apparatus 10 in accordance with an aspect of the present invention. The display apparatus 10 comprises a plurality of pins 11-18 arranged in an array such that respective head portions 21-28 associated with the pins collectively define a display surface 30. It will be appreciated that the area of the array is not necessarily defined by two Cartesian dimensions. For example, the pins could be arranged along a spherical or hemispherical surface, with the array spanning the azimuthal and polar dimensions across the surface of the sphere.

The position of a given pin (e.g., 11) can be adjusted along an axis of motion. A motion plate 32 can be moved along the axis of motion as to adjust the position of the pins. The motion plate 32 can be moved by reasonable mechanical or electromagnetic means. For example, the plate 32 can be moved via an electrical motor, a hydraulic assembly, or one or more solenoid coils exerting a magnetic force. It will be appreciated that the plate 32 can be used both to move the pins as a mass and to regulate the action of a force (e.g., gravity, air pressure, mechanical pressure) operating to move the pins along the axis of motion.

A clutch mechanism 34 operates in conjunction with the motion plate 32 to position the plurality of pins. The clutch mechanism 34 is operative to arrest the motion of a given pin at a desired position. The respective positions of the pins can be selected to deform the display surface into a desired raised image. The clutch mechanism can comprise reasonable means for selectively arresting the motion of the pins. For example, the clutch mechanism 34 can comprise components for mechanically or magnetically engaging the pins.

Figure 2:
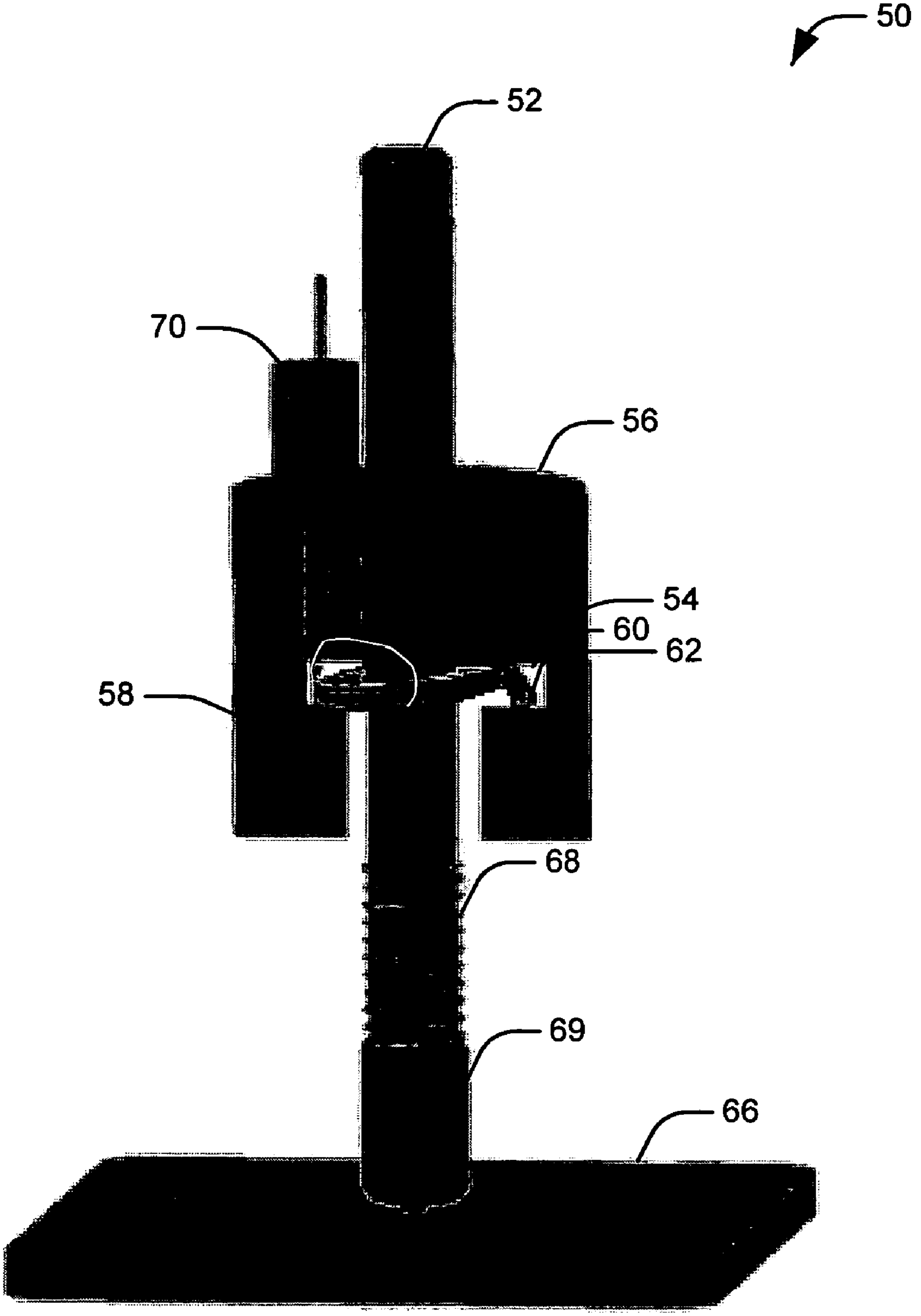
FIG. 2 illustrates an exemplary clutch mechanism for engaging a pin in accordance with an aspect of the present invention.

FIG. 2 illustrates an exemplary clutch mechanism 50 for engaging a pin 52 in accordance with an aspect of the present invention. The exemplary clutch mechanism 50 utilizes a washer 54 to mechanically engage the pin, such that the pin cannot move in a selected direction. In the illustrated example, the washer 54 is arranged to prevent the pin from falling downward, but it will be appreciated that a given display can be aligned in any direction and that the washer 54 can be utilized to hold the pin against forces other than gravity (e.g., air pressure, a mechanical spring force). In FIG. 2, it will be appreciated that the electromagnetic plate 56, the clutch plate 58, and the washer recess 60 are shown in cross-section to better illustrate other components of the clutch mechanism 50. Other components are illustrated in perspective.

In the exemplary embodiment, the body of the washer 54 is flat and roughly circular, with a circular hole through the center slightly larger in diameter than the pin 52. It will be appreciated, however, that washers and pins of different shapes can be used within the spirit of the invention. The washer includes a tab 62 that extends outside of the plane of the washer, as to raise one side of the washer off of a contact surface of the washer recess 60. In the illustrated example, the contact surface is the lower surface of the washer recess 60, but it will be appreciated that the position of the contact surface within the washer recess 60 can vary with the orientation of the device. This causes the washer 54 to physically engage the pin, restricting its movement. It will be appreciated that a similar effect can be achieved by shaping a portion of the contact surface of the washer recess 60 to raise one side of the washer from the surface.

It will be appreciated that tilting the washer to one side, as illustrated, will restrict the movement of the washer only in one direction. For example, in the illustrated implementation, the washer 54 prevents the pin from moving downward. When the pin 52 is moved upward, the washer 54 is lifted with the pin, allowing the pin to move freely. Thus, the pin 52 can be moved upward when desired by a reset plate 64 associated with the display, but can be held in place while the reset plate 64 is lowered. It will be appreciated that the reset plate 64 can be common to all pins, simultaneously raising all the pins to a reset position prior to displaying a particular relief image.

When the pin 52 has been moved to a reset position by the reset plate 64, a reset mechanism can engage the washer to bring it to a level position. In the illustrated example, the reset mechanism comprises a spring 68 encompassing the pin at a position near its end, but it will be appreciated that other reset mechanisms can be utilized. The spring 68 is held in place by a rubber pin cap 69 affixed to the end of the pin 52 opposite the cap portion. As the pin 52 is extended, the spring 68 is compressed, placing pressure on the washer 54. The pressure from the spring 68 raises the washer 54 to a level position and presses it against an electromagnet 70 embedded in the electromagnetic plate 56. The electromagnet 70, when activated, holds the washer 54 in the level position, allowing the pin 52 to slide freely through it as the reset plate 64 is lowered. When the pin 52 reaches a desired position, the electromagnet 70 can be deactivated, allowing the washer 54 to fall into its tilted position, stopping the pin at the desired position.

Figure 3:
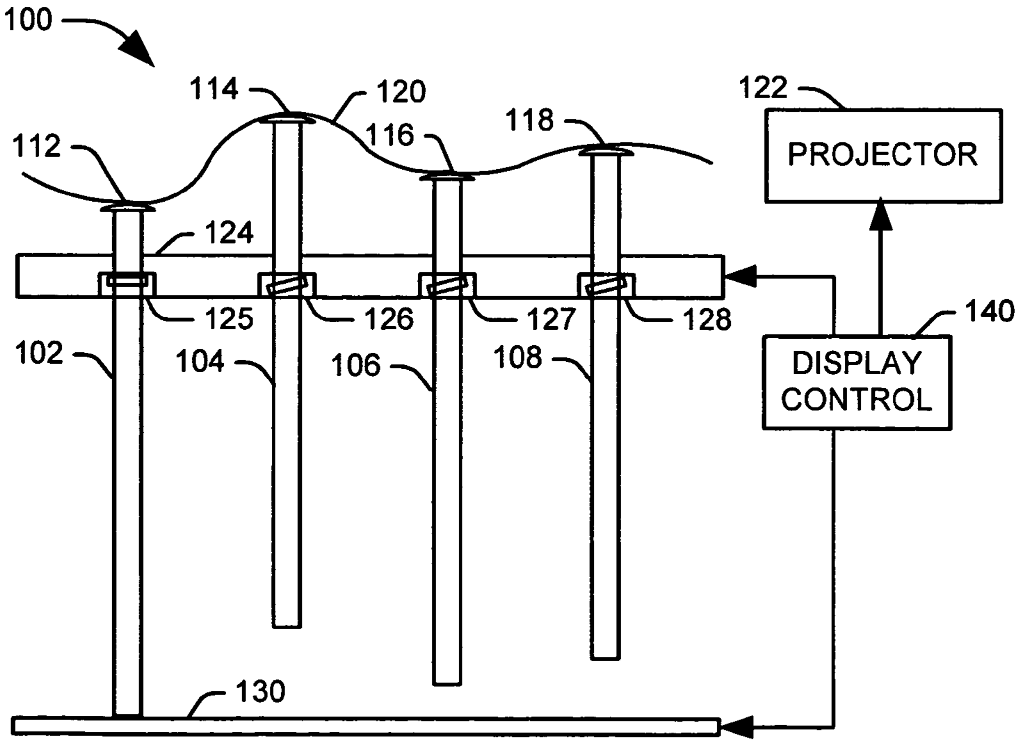
FIG. 3 illustrates a side view of an exemplary raised display in accordance with an aspect of the present invention.

FIG. 3 illustrates a side view of an exemplary raised display 100 in accordance with an aspect of the present invention. The selected view of the display 100 comprises one row of four pins 102, 104, 106, and 108. It will be appreciated that a functioning display can contain a large number of pins arranged across multiple rows. For example, an exemplary thirty-two square inch display can include around one thousand pins arranged in about twenty rows, depending on the pin diameters and spacing. An exemplary table-sized display can utilize over one million pins in over two hundred rows.

In an exemplary embodiment, the rows containing the pins 102, 104, 106, and 108 are staggered as to form a honeycomb pattern. Accordingly, the pins 102, 104, 106, and 108 are arranged in a plurality of linear rows and one or more staggered columns. Alternatively, the pins can be arranged in a Cartesian grid, such that both the rows and the columns are linear. It will be appreciated that other methods of arranging the pins can be utilized, and that the placement of the pins will vary with the necessary size and spacing of the pins, as well as the desired shape (e.g., flat, spherical, recessed) of the array. It will further be appreciated that while the illustrated example shows a vertical display in which the pins are lowered by gravity, displays of other orientations that utilize other forces to retract or extend pins (e.g., air pressure, mechanical force) can also be utilized within the spirit of the invention.

In the illustrated display, the pins 102, 104, 106, and 108 have respective cap portions 112, 114, 116, and 118 that define a raised surface. The cap portions 112, 114, 116, and 118 can be covered by an elastic membrane 120 to provide a relatively smooth surface for the display. The use of the pin caps 112, 114, 116, and 118 and the membrane 120 will depend on the application for which the display is being used. For example, a Braille reader would not require pin caps or a membrane as they would blunt the tactile distinctiveness of the raised pins. The membrane 120 can serve, however, as a backdrop for an image, such as a landscape, projected from a projector 122, allowing the raised display 100 to provide a textured relief map of an area.

The pins 102, 104, 106, and 108 pass through respective apertures in a stationary, outer plate 124. The outer plate 124 comprises the joined electromagnetic plate and the clutch plate described under FIG. 2. The outer plate 124 houses a plurality of clutch mechanisms 125-128 similar to that illustrated in FIG. 2, each associated with a respective one of the plurality of pins that can be utilized to maintain the pins in their desired positions. In the present example, the washers within the clutch mechanism are aligned as to prevent the pins from retracting when the washers are in their tilted position. It will be appreciated that the washers arrest the movement of the pins only in one direction when they are tilted, and that the pins can be freely extended regardless of the position of the washer in the present example. During operation, the pins can be reset into a fully extended position by a reset plate 130. As part of this process, the washers associated with the pins will be raised into a level position by a reset mechanism associated with the pins. For example, the reset mechanism can include a spring or bar that is moved into contact with the washer by the reset plate 130 to shift the washer to a level position. Once the pins 102, 104, 106, and 108 are fully extended, the electromagnets in the outer plate 124 associated with each pin can be activated to hold the washers in place, allowing the pins the move freely in both directions.

The reset plate 130 can then be slowly withdrawn to allow the pins 102, 104, 106, and 108 to retract toward the interior of the display device. In an exemplary embodiment, the reset plate 130 is moved by a motor and belt arrangement (not shown). The movement of the reset plate 130 and the operation of the clutch mechanism can be coordinated by a display control 140 to adjust the position of the pins 102, 104, 106, and 108. The display control 140 can comprise a microprocessor running a software program or dedicated control circuitry. For example, the reset plate 130 can be withdrawn toward the interior of the display device 100 at a known rate, lowering the unsecured pins with it. The various electromagnets in the outer plate 124 can be deactivated to release the washer to the tilted position and secure one or more of the pins at a time associated with a desired position of the clutch plate. Thus, the pins can be secured when the plate reaches the desired position. The display control 140 can also be operatively connected to the projector 122 as well to provide information relating to the desired pin positions to the projector.

Figure 4:
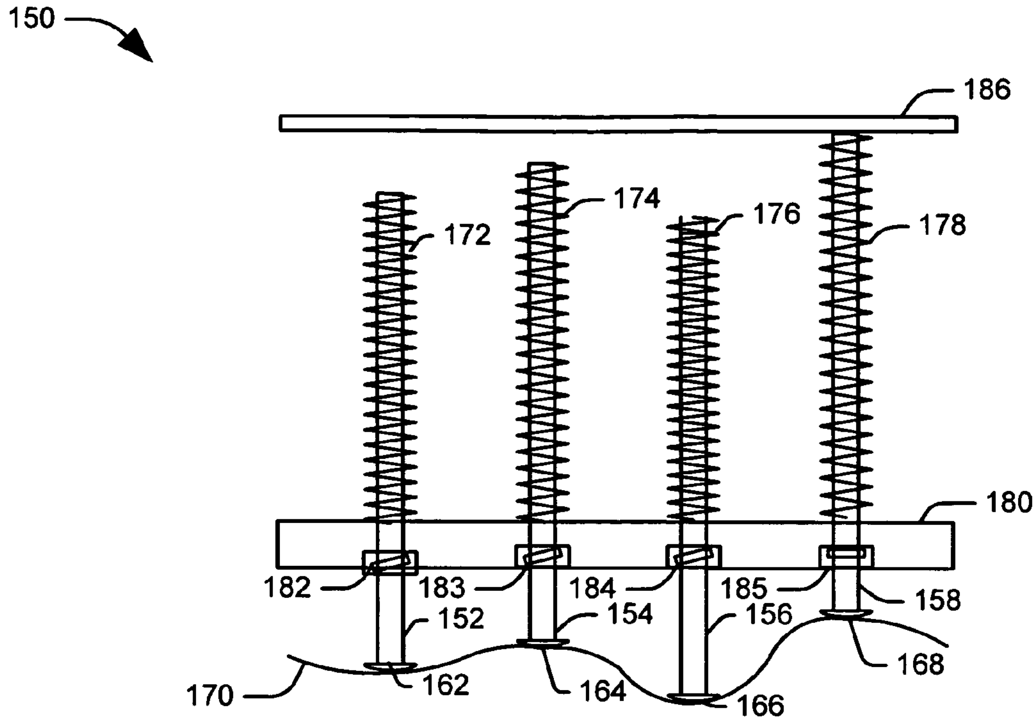
FIG. 4 illustrates a side view of a second exemplary raised display in accordance with an aspect of the present invention.

FIG. 4 illustrates a display system 150 that can be oriented in any fashion. The illustrated example is oriented with the direction of the extension being reversed from previous examples (e.g., the direction of extension is in the direction of gravity), but it will be appreciated that it would work equally well in any orientation. The display 150 comprises a plurality of pins 152-158 having respective cap portions 162-168 that define a raised surface. The cap portions 162-168 can be covered by an elastic membrane 170 to provide a relatively smooth surface for the display.

In the illustrated example, the pins 152-158 have associated springs 172-178, with each spring (e.g., 172) attached at a first end to the underside of an outer plate 180 and at a second end to the end of the pin (e.g., 152) opposite the cap portion (e.g., 162). When the pins 152-158 are fully extended, the springs 172-178 are compressed against the underside of the outer plate 180. The springs 172-178 thus provide a tensive force on the pins 152-158 as to draw the pins toward the interior of the display device 150.

The outer plate 180 houses a plurality of clutch mechanisms 182-185 similar to that illustrated in FIG. 2 that can be utilized to maintain the pins in desired positions. In the present example, the washers within the clutch mechanism are aligned as to prevent the pins from retracting when the washers are in their tilted position. When a given washer is held in a level position by its associated electromagnet, a pin can pass freely through the washer. When the electromagnet is not powered, a spring or similar mechanism can be utilized to return the washer to the tilted position. During operation, the pins can be reset into a fully extended position by a reset plate 186. Once the pins 152-158 are fully extended, the electromagnets in the outer plate 180 associated with each pin can be activated to hold the washers in place, allowing the pins to move freely in both directions. The reset plate 186 can then be slowly withdrawn to allow the pins 152-158 to be pulled toward the reset plate 186 by their associated springs 162-168. The various electromagnets in the outer plate 124 can be deactivated to release the washer to the tilted position when their respective pins reach their desired position.

It will further be appreciated that other mechanisms can be used to move the pins without or against the action of gravity. For example, the pins 152-158 can be extended through the use of an air pump to apply positive air pressure to the ends of the pins opposite their cap portions. A mobile check plate can operate to halt the extension of the pins, allowing the rate of extension of the pins 152-158 to be controlled. The clutch mechanism can be engaged when the pins reach the desired position as described above.

Figure 5:
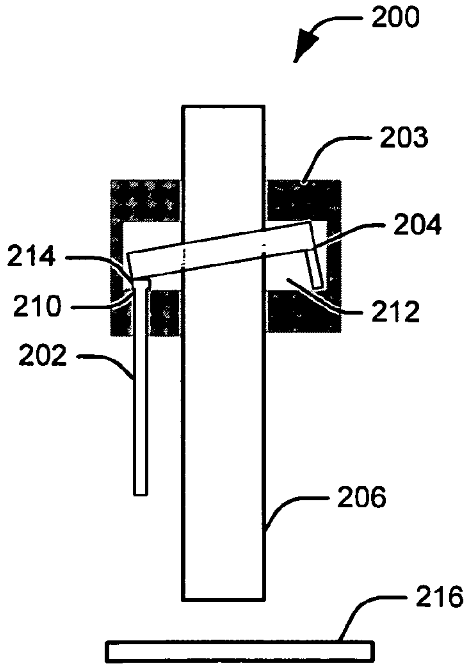
FIG. 5 illustrates an exemplary clutch mechanism in accordance with an aspect of the present invention, wherein the clutch mechanism is in a first position.
Figure 6:
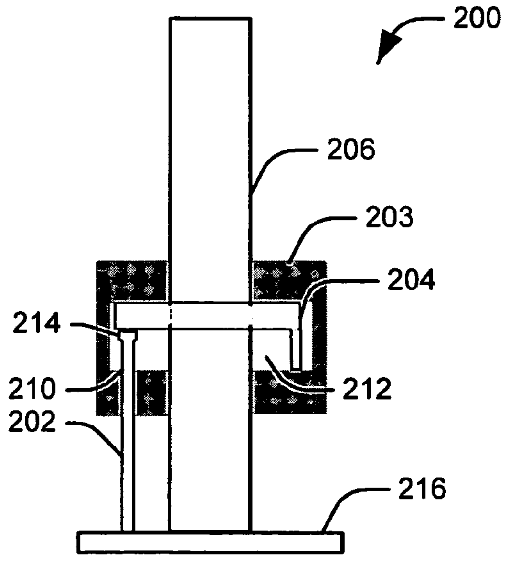
FIG. 6 illustrates the exemplary clutch mechanism of FIG. 5 in a second position.

FIGS. 5 and 6 illustrate a clutch mechanism having an alternative reset mechanism, in the form of a reset pin 202, for a clutch mechanism in accordance with an aspect of the present invention. The clutch mechanism is housed in a recess within a clutch plate 203. The reset pin 202 operates to move a washer 204 from a titled position, in which it engages an associated pin 206, to a level position. An electromagnet (not shown) can be used to maintain the washer 204 at the level position. FIGS. 5 and 6 illustrate the same structure at different stages in its operation, thus similar components of the structure will be labeled with the same numbering.

FIG. 5 illustrates the clutch mechanism 200 at a first position, in which the reset pin 202 is not engaging the washer. In the illustrated position, the washer 204 is in a tilted position such that the portion of the washer closest to the reset pin 202 is lowered relative to the other side. The reset pin 202 is suspended from an aperture 210 in a washer recess 212. The reset pin 202 includes a head portion 214 that is slightly larger than the aperture to maintain the reset pin in its suspended position. It will be appreciated that in the illustrated position, the end of the reset pin 202 opposite the head portion 214 remains above the surface of an associated reset plate 216.

FIG. 6 illustrates the clutch mechanism 200 at a second position, in which the reset pin 202 is engaging the washer. In FIG. 6, the reset plate 216 has been moved upward to extend the reset pin 202 through the aperture 210. Consequently, the head portion 214 of the reset pin 202 contacts the lowered side of the washer 204 and raises it to bring the washer to a level position. Once the washer 204 has been brought to a level position, an electromagnet (not shown) can be activated to hold the washer level even after the reset plate 216 has retracted and the reset pin 202 has dropped back into its suspended position.

Figure 7:
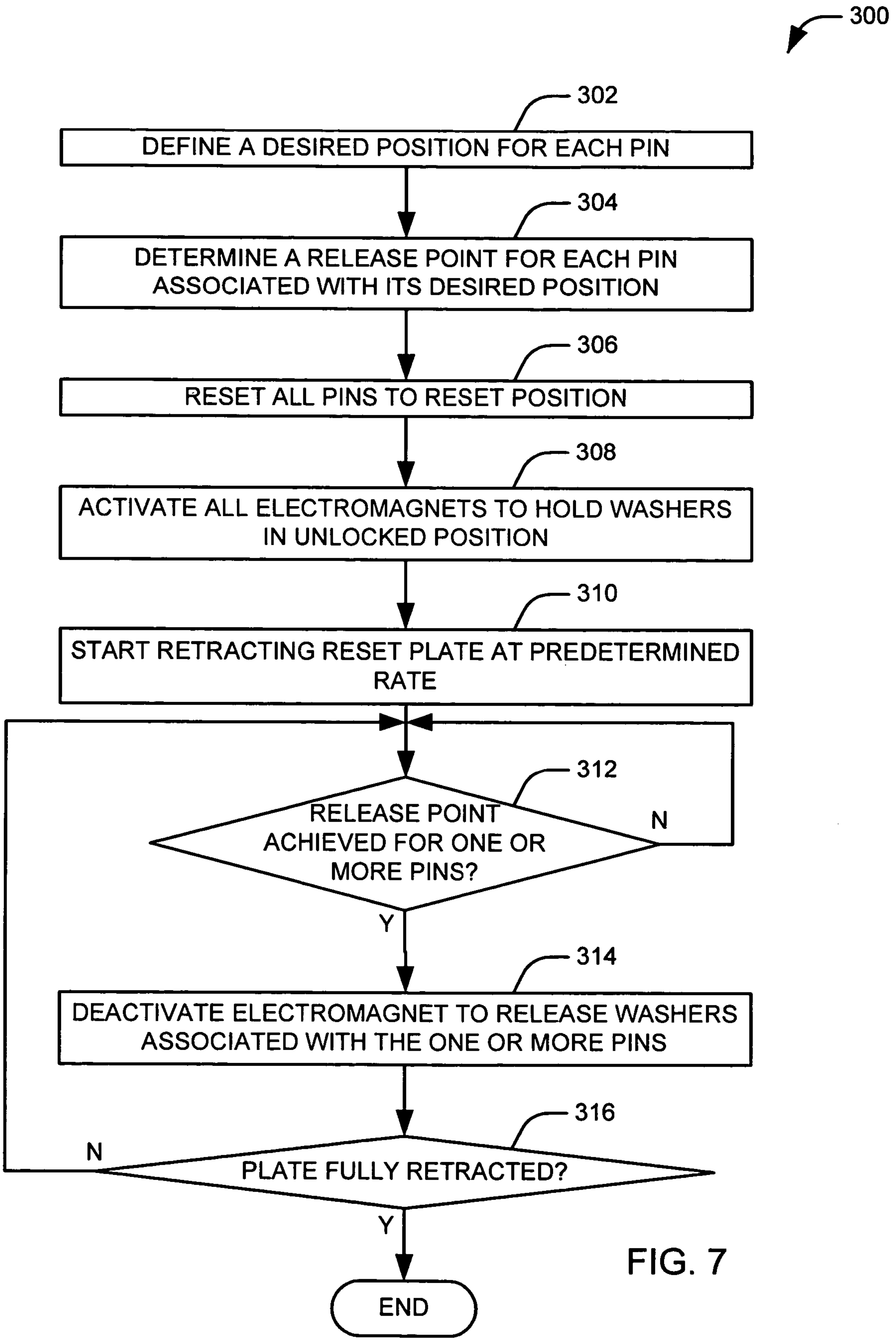
FIG. 7 illustrates an exemplary methodology for displaying a raised image in accordance with an aspect of the present invention.

In view of the foregoing structural and functional features described above, methodologies in accordance with various aspects of the present invention will be better appreciated with reference to FIG. 7. While, for purposes of simplicity of explanation, the methodology of FIG. 7 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 7 illustrates an exemplary methodology 300 for displaying a raised image comprising a plurality of pins in accordance with an aspect of the present invention. At 302, a desired position is defined for each pin. The defined positions can be provided as input to a control portion of the display from a human operator or from another, related system. For example, appropriate values can be provided from an imaging program that allows an operator to define a desired relief image for the display. At 304, appropriate release points are determined for the plurality of pins in the display. The calculated delay times represent the time it will take for a pin to reach its desired position as a reset plate associated with the pins is retracted. This can be determined according to one or more of the desired positions for each pin, the rate at which the reset plate retracts, the delay in response of the electromagnet holding the washer, and the time it takes the washer to fall or be pulled back into a tilted position.

At 306, the plurality of pins are moved into a reset position. When the pins are in a reset position, the washers associated with the pins are moved to a level position via respective reset mechanisms (e.g., reset spring or pin). In an exemplary implementation, this can be accomplished by moving the reset plate to a position of maximum extension, pushing the pins to a position of full extension. At 308, one or more electromagnets associated with each washer are activated to maintain the washers in an unlocked position.

At 310, the plate begins retracting at a predetermined rate. The pins, which were supported by the plate, retract at the same rate of the plate. The retraction of the pins can be facilitated by one or more of gravity, a mechanical spring force, air pressure, or a similar force. The system measures the elapsed time since the plate began retracting. This allows the system to track the position of the plate according to its known rate of retraction, and accordingly, track the position of the pins. At 312, it is determined if a calculated delay times for one or more of the pins has been achieved. If not (N), the methodology 300 returns to 312 to await a calculated delay time. If so (Y), the one or more pins associated with the delay time have reached approximately their required position, and the methodology advances to 314.

At 314, respective electromagnets associated with the one or more pins are deactivated to release their associated washers. The washers, once released, return to their tilted position either via gravity or a mechanical or electromagnetic return mechanism. Once the washers have resumed their tilted positions, they engage their respective pins to prevent further retraction of the pins. This arrests the pins at the desired position. The methodology 300 then advances to 316, where it is determined if the plate is fully retracted. If the plate is not fully retracted (N), the methodology returns to 312 to determine if a calculated delay time for any additional pins has been achieved. If the plate is fully retracted (Y), all pins have been adjusted to their desired position and the methodology 300 terminates.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the spirit and scope of the appended claims.

What is claimed is:

1. A clutch assembly for securing a pin within a raised display system, comprising:

a washer that surrounds the pin;

a washer recess having a contact surface, the contact surface being configured as to bring the washer into a tilted position relative to the pin, such that the washer is brought into physical communication with the pin;

a reset mechanism that moves at least a portion of the washer to force the washer into a position substantially level relative to the pin, such that the pin can move freely through the washer; and an electromagnet that holds the washer in the substantially level position when the electromagnet is activated.

2. The assembly of claim 1, the reset mechanism comprising a spring encompassing the pin, the spring engaging the washer when the pin is moved into a reset position.

3. The assembly of claim 1, the contact surface being a level surface, and the washer comprising a tab at one position on its circumference, the tab causing the washer to assume a tilted position when resting on the contact surface.

4. The assembly of claim 1, further comprising a reset plate operative to move the pin into a fully extended position and gradually retract to allow the pin to return to a retracted position.

5. The assembly of claim 4, the reset mechanism comprising a reset pin that engages the washer when the reset pin is contacted by the reset plate.

6. The assembly of claim 4, further comprising a display control that controls the reset plate and the electromagnet, such that the electromagnet can be deactivated as to release the washer when the reset plate has retracted to a desired position.

7. A display system for displaying raised images comprising:

a plate that moves along at least one axis of motion, the movement of the plate being operative to adjust respective positions associated with a plurality of pins along the axis of motion; and a plurality of clutch mechanisms that operate in conjunction with the plate to position the plurality of pins at desired positions along the axis of motion as to deform a display surface defined by the plurality of pins, a given clutch mechanism comprising:

a washer surrounding an associated one of the plurality of pins, operative to assume a first position and a second position;

a reset mechanism that adjusts the washer from the first position to the second position; and an electromagnet that holds the washer in the second position when the electromagnet is activated.

8. The system of claim 7, the reset mechanism comprising a reset pin that engages the washer when the reset pin is contacted by the plate.

9. The system of claim 7, the reset mechanism comprising a spring encompassing the pin, the spring engaging the washer when the pin is contacted by the plate.

10. The system of claim 7, wherein the washer prevents the pin from moving along one direction of the axis of motion when the washer is in the first position, and allows the pin to move freely when the washer is in the second position.

11. The system of claim 10, further comprising a display control that coordinates the operation of the plate and the plurality of clutch mechanisms as to allow a given washer to return to the first position when its associated pin is in a desired position.

12. The system of claim 7, further comprising an air pressure source that applies air pressure to the ends of the pins, the plate acting to control the motion of the pins.

13. The system of claim 7, each of the plurality of pins having a respective spring, the spring being attached to the end of the pin and to a stationary plate as to apply a force to the pin along the axis of motion when the spring is compressed.

14. The system of claim 7, further comprising a projector that projects an image onto the display surface.

15. The system of claim 7, further comprising a membrane that covers the plurality of pins, such that the membrane is distorted by the movement of the pins.

16. A method for displaying raised images using a plurality of pins, comprising:

resetting respective washers associated with the plurality of pins from a first position, in which the pins are secured, to a second position, in which the pins can move freely;

activating respective electromagnets associated with the washers to maintain the washers in the second position; and deactivating an electromagnet associated with a given washer to allow the washer to return to the first position when its associated pin is in a desired position.

17. The method of claim 16, further comprising:

adjusting all of the pins to a fully extended position via a moving plate; and retracting the plate at a constant rate as to control the retraction of the pins.

18. The method of claim 17, further comprising calculating an associated delay for each pin based upon the constant rate of the plate and the desired position of the pin.

* * * * *